July 20, 1948.   H. P. CALDWELL, JR   2,445,560
CATALYTIC ALKYLATION
Filed Oct. 31, 1945
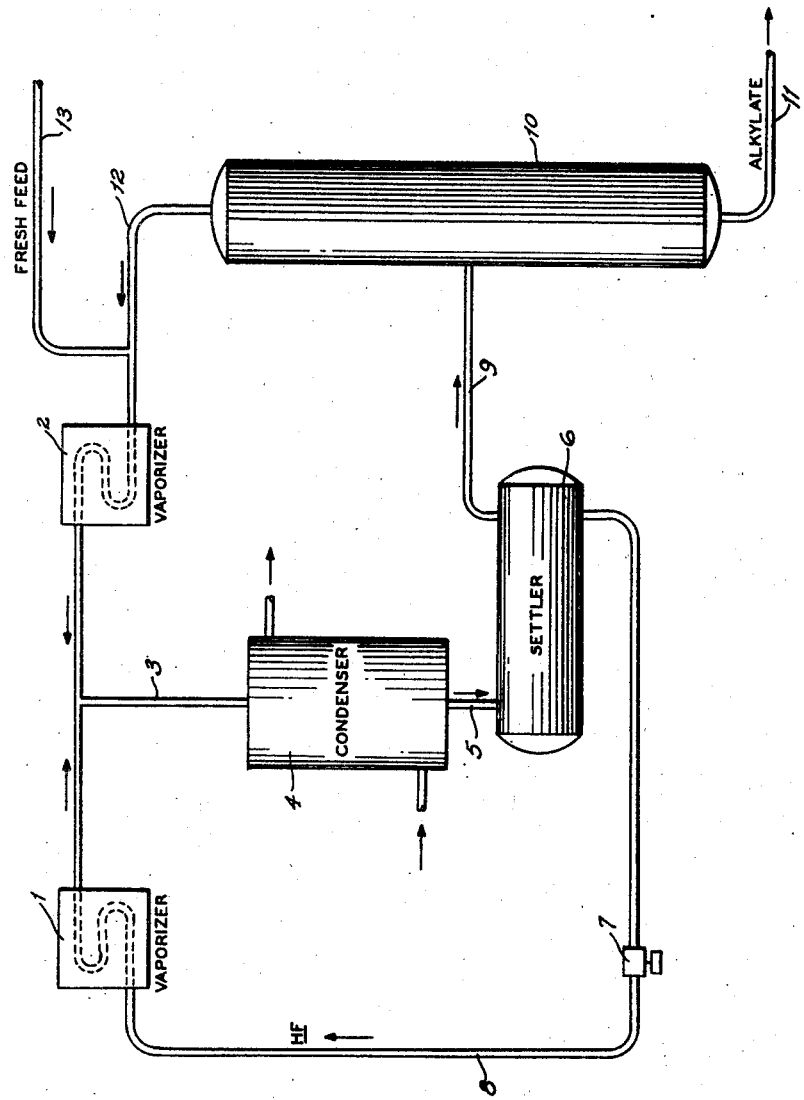
Hamilton P. Caldwell
INVENTOR.
BY
ATTORNEY Patented July 20, 1948

2,445,560

UNITED STATES PATENT OFFICE 2,445,560

CATALYTIC ALKYLATION

Hamilton P. Caldwell, Jr., Woodbury, N. J., assignor to Socony-Vacuum Oil Company, Incorporated, a corporation of New York Application October 31, 1945, Serial No. 625,873

4 Claims. (Cl. 260—683.4)

This invention relates to a process for the catalytic alkylation of isoparaffins with olefins in the presence of a liquid hydrogen fluoride catalyst.

The conventional hydrogen fluoride alkylation process involves violent agitation of liquid hydrogen fluoride with a hydrocarbon mixture of isoparaffins and olefins in suitable proportion to induce alkylation as a principal reaction. Considerable care has been taken to insure that all reactants remain in the liquid phase during the course of the reaction step. As is well known, the isoparaffin reactant must be present in considerable excess, usually 3:1 or greater with respect to olefin, in order to suppress polymerization and to thus cause alkylation to occur as the principal reaction. A fairly wide range of temperatures have been suggested, and, in general, it appears that the reaction occurs in liquid phase at any temperature at which the various components of the reaction mixture may be maintained liquid.

Vapor phase alkylation with a hydrogen fluoride catalyst is also possible, the reaction occurring at elevated temperatures and pressures, on the order of 650° F. at 500–1000 pounds per square inch. The reaction will take place at lower temperatures if the pressure is increased. The course of alkylation where both reactants and catalyst are in the vapor phase appears to differ somewhat from liquid phase alkylation, and it is presumed that liquid phase alkylation typically occurs at the interface between the two immiscible phases of catalyst and hydrocarbon.

In application Serial Number 481,430, filed April 1, 1943, by Harry G. Doherty and Arlie A. O'Kelly there is described an alkylation reaction in which the reactants are introduced in vapor phase to a body of liquid hydrogen fluoride to thereby produce a high grade alkylate.

According to the present invention, it has now been discovered that an alkylation reaction can be advantageously conducted by condensing a vapor phase mixture of hydrogen fluoride and hydrocarbons proportioned as to isoparaffins and olefins for liquid phase alkylation. The vapor phase mixture is maintained at all times below conditions of temperature and pressure at which substantial vapor phase alkylation will occur and is caused to condense, thus producing an intimate contact between hydrocarbon reactants and catalyst which induces the desired reaction in liquid phase. In the vapor phase the hydrocarbons and catalyst are completely miscible with each other and presumably form a molecular dispersion of uniform composition throughout. At the instant of condensation the degree of dispersion is extremely high and the alkylation reaction rapidly takes place. The condensation may be induced either by cooling or increase in pressure or both. Increase in pressure requires the use of compressors and is, therefore, expensive as compared with cooling of the mixture. For that reason, condensation by simple cooling is greatly preferred.

Previously known processes of conducting the alkylation reaction result predominantly in products boiling within the aviation gasoline range and are, therefore, particularly suited to the preparation of aviation gasoline components. The present process yields a product of higher boiling range by formation of higher isoparaffin products at the expense of part of the alkylate which is suitable in aviation gasoline. This broader boiling range is of material advantage in the manufacture of motor gasoline for automotive use, since previously known alkylates must be balanced by addition of heavier components to prepare a suitably balanced motor fuel.

It is accordingly a primary object of the present invention to provide a novel process of isoparaffin alkylation yielding a product better suited to the manufacture of motor gasoline. To effectuate this object the alkylation reaction is conducted by condensing a vapor phase mixture of hydrogen fluoride, isoparaffins and olefins.

The invention will be more clearly understood from the detailed description of preferred embodiments thereof in connection with the attached drawings showing, in diagrammatic form, apparatus for conducting the reaction.

As shown in the drawings, the invention preferably involves vaporization of hydrogen fluoride in a vaporizer 1 and vaporization of a suitable hydrocarbon mixture containing isoparaffins and olefins in vaporizer 2. The vapors from the two vaporizers are combined in pipe 3 and conducted to condenser 4 wherein they are cooled to yield an intimate mixture of liquid hydrogen fluoride and liquid hydrocarbon reactants. Under these conditions the hydrocarbons react rapidly to form an alkylate which is discharged, together with liquid hydrogen fluoride, and unreacted isoparaffins through pipe 5 to a settler 6. In settler 6 the liquids stratify to form a lower layer of liquid hydrogen fluoride which is recycled by pump 7 through pipe 8 into the vaporizer 1. Conventional means for removal and regeneration of spent acid and addition of fresh acid catalyst may be incorporated in the return line, as is well understood in the art.

The hydrocarbon layer from settler 6 is transferred by line 9 to a fractionating column 10 in which it is separated to provide recycle isoparaffin reactant as an overhead product and crude alkylate as bottoms. The crude alkylate is passed by line 11 to conventional equipment for removing fluoride and redistilling to yield an alkylate of desired boiling range. The recycled isobutane overhead passes by line 12 to be admixed with a fresh feed mixture from line 13 containing olefins and additional isoparaffin reactants.

As shown in the drawings, the hydrocarbons and acid catalyst are vaporized separately and then combined to form the mixture to be condensed. It will be readily understood that this manner of vaporization is not absolutely essential and that any manner of forming a desired vapor phase mixture may be practiced so long as care is taken that temperatures of the mixture are kept low enough to prevent substantial vapor phase alkylation. It will be readily understood that economic considerations dictate vapor temperatures as low as are consistent with insuring that the reactants and catalyst be in vapor phase until complete mixing has taken place. Any excessive heating of the reactants or catalyst merely results in unnecessary consumption of heat and the placing of unnecessary load on the condenser.

In a series of small scale runs, alkylate highly suited to the requirements of motor gasoline has been produced by the process of this invention. In each of the examples set out below a hydrocarbon mixture of isobutane and butene and hydrogen fluoride were separately vaporized, then mixed and passed to the top of the condenser consisting of the annular cooling space between two tubes. Cooling water was flowed through the inner tube and about the exterior of the outer tube.

*Example I*

A charge mixture of isobutane and butene in a molar ratio of 6.66 mols of the isoparaffin per mol of the olefin was vaporized at 136° F. and mixed with hydrogen fluoride vapor at 172° F. in a hydrocarbon to HF ratio by volume of 2.94 under a pressure of 59 pounds per square inch gauge. The mixture, at a temperature of 153° F., was passed to the top of the condenser thus inducing the reaction. The temperature at the bottom of the condenser was 82° F. A yield of 194 per cent by weight per cent (based on butenes charged) of debutanized alkylate was obtained. This alkylate had a Norwood bromine number of 0.9, A. P. I. gravity of 65.2 and contained 0.0069 per cent of fluorine by weight. The alkylate was analyzed by distillation and found to contain an unusually high percentage of higher boiling paraffins as compared with conventional alkylates. The octane fraction constituted 41.8 per cent by volume with 29 per cent boiling below the octane range and 29.2 per cent boiling above. Of the latter fraction 9.8 per cent was found to be heavier than $C_{11}$.

*Example II*

In a similar run, hydrocarbons at 126° F. were combined with hydrogen fluoride at 171° F. to yield a mixture at 159° F. and 68 pounds pressure. The hydrocarbon to HF ratio in this case was 0.97. Upon condensation in a condenser having a bottom temperature of 88° F. an alkylate was obtained of which 33.6 per cent was octanes with 37.8 per cent of lower boiling and 28.6 per cent of higher boiling materials.

*Example III*

Still maintaining the molar ratio of isobutane to butene at 6.66 as in the previous examples and using a hydrocarbon to HF ratio of 1.01, the mixture at 162° F. and 37 pounds pressure was condensed in a condenser having a bottom temperature of 65° F. 30.8 per cent of the alkylate boiled below the octane range with 30.8 per cent boiling above octanes. 38.4 per cent of octanes were found.

*Example IV*

In this and the two succeeding examples, the isobutane to butene ratio was maintained at 7.2 and the ratio of hydrocarbon to acid was varied. In this example the latter ratio was 0.98 and a mixture at 125° F. and 39.2 pounds pressure was passed to a condenser having the bottom temperature maintained at 48° F. The debutanized alkylate contained 35.9 per cent of octanes with the remainder distributed about equally between higher and lower boiling components. 15.5 per cent of the alkylate boiled above $C_{11}$.

*Example V*

In this run the $C_4$ hydrocarbon mixture was vaporized and heated to 108° F. and mixed with hydrogen fluoride at 158° F. in a hydrocarbon to HF ratio of 15.2, to form a mixture having a temperature of 115° F. at 38.7 pounds pressure. The bottom temperature of the condenser was 50° F. and the debutanized alkylate was found to contain 23.3 per cent of material boiling below octanes, 38 per cent octanes and 38.7 per cent of material boiling above the octane range. 20.3% of the alkylate boiled above $C_{11}$.

*Example VI*

A vapor phase mixture having a hydrocarbon to HF ratio of 7.1 was formed at 122° F. and 39 pounds per square inch. This was passed to a condenser having a bottom temperature of 47° F. and an alkylate recovered which contained 30 per cent boiling below octanes, 40.1 per cent in the octane range and 29.9 per cent of higher boiling range.

I claim:

1. A process for the alkylation of isoparaffins with olefins which comprises preparing a vapor phase mixture of isoparaffin, olefin and hydrogen fluoride under conditions of temperature and pressure which inhibit alkylation in the vapor phase in proportions suitable for liquid phase alkylation catalyzed by hydrogen fluoride, condensing the said mixture to effect intimate contact between a condensed hydrocarbon phase containing isoparaffin and olefin and a condensed hydrogen fluoride phase under alkylation conditions, separating the hydrocarbon phase from the hydrogen fluoride phase and recovering products of the reaction from the hydrocarbon phase.

2. A process for the alkylation of isoparaffins with olefins which comprises preparing a vapor phase hydrocarbon charge of isoparaffin and olefin in proportions suitable for liquid phase alkylation catalyzed by hydrogen fluoride and a hydrogen fluoride vapor, mixing said charge and said vapor to provide a mixture under conditions of temperature and pressure which inhibit alkylation in the vapor phase, condensing the said mixture to effect intimate contact between a condensed hydrocarbon phase containing isoparaffin and olefin and a condensed hydrogen fluoride phase under alkylation conditions, separating the hydrocarbon phase from the hydrogen fluoride phase and recovering products of the reaction from the hydrocarbon phase.

3. A process for the alkylation of isobutane with butene which comprises preparing a vapor phase mixture of isobutane, butene and hydrogen fluoride under conditions of temperature and pressure which inhibit alkylation in the vapor phase in proportions suitable for liquid phase alkylation catalyzed by hydrogen fluoride, condensing the said mixture to effect intimate contact between a condensed hydrocarbon phase containing isobutane and butene and a condensed hydrogen fluoride phase under alkylation conditions, separating the hydrocarbon phase from the hydrogen fluoride phase and recovering products of the reaction from the hydrocarbon phase.

4. A process for the alkylation of isobutane with butene which comprises preparing a vapor phase hydrocarbon charge of isobutane and butene in proportions suitable for liquid phase alkylation catalyzed by hydrogen fluoride and a hydrogen fluoride vapor, mixing said charge and said vapor to provide a mixture under conditions of temperature and pressure which inhibit alkylation in the vapor phase, condensing the said mixture to effect intimate contact between a condensed hydrocarbon phase containing isobutane and butene and a condensed hydrogen fluoride phase under alkylation conditions, separating the hydrocarbon phase from the hydrogen fluoride phase and recovering products of the reaction from the hydrocarbon phase.

HAMILTON P. CALDWELL, JR.

REFERENCES CITED

The following references are of record in the file of this patent:

UNITED STATES PATENTS

| Number | Name | Date |
| --- | --- | --- |
| 2,317,694 | Ott | Apr. 27, 1943 |
| 2,322,800 | Frey | June 29, 1943 |
| 2,335,704 | Smith | Nov. 30, 1943 |
| 2,378,439 | Schlesman | June 19, 1945 |
| 2,379,368 | Matuszak | June 26, 1945 |
| 2,403,922 | Hawthorne | July 16, 1946 |
| 2,409,090 | Woodward et al. | Oct. 8, 1946 |